March 10, 1942.   K. LOWITZSCH   2,275,857
CASSETTE FRAME FOR X-RAY USE
Original Filed July 30, 1940    2 Sheets-Sheet 1

INVENTOR.
KURT LOWITZSCH
BY Chester Tietig
ATTORNEY.

March 10, 1942. K. LOWITZSCH 2,275,857
CASSETTE FRAME FOR X-RAY USE
Original Filed July 30, 1940  2 Sheets-Sheet 2
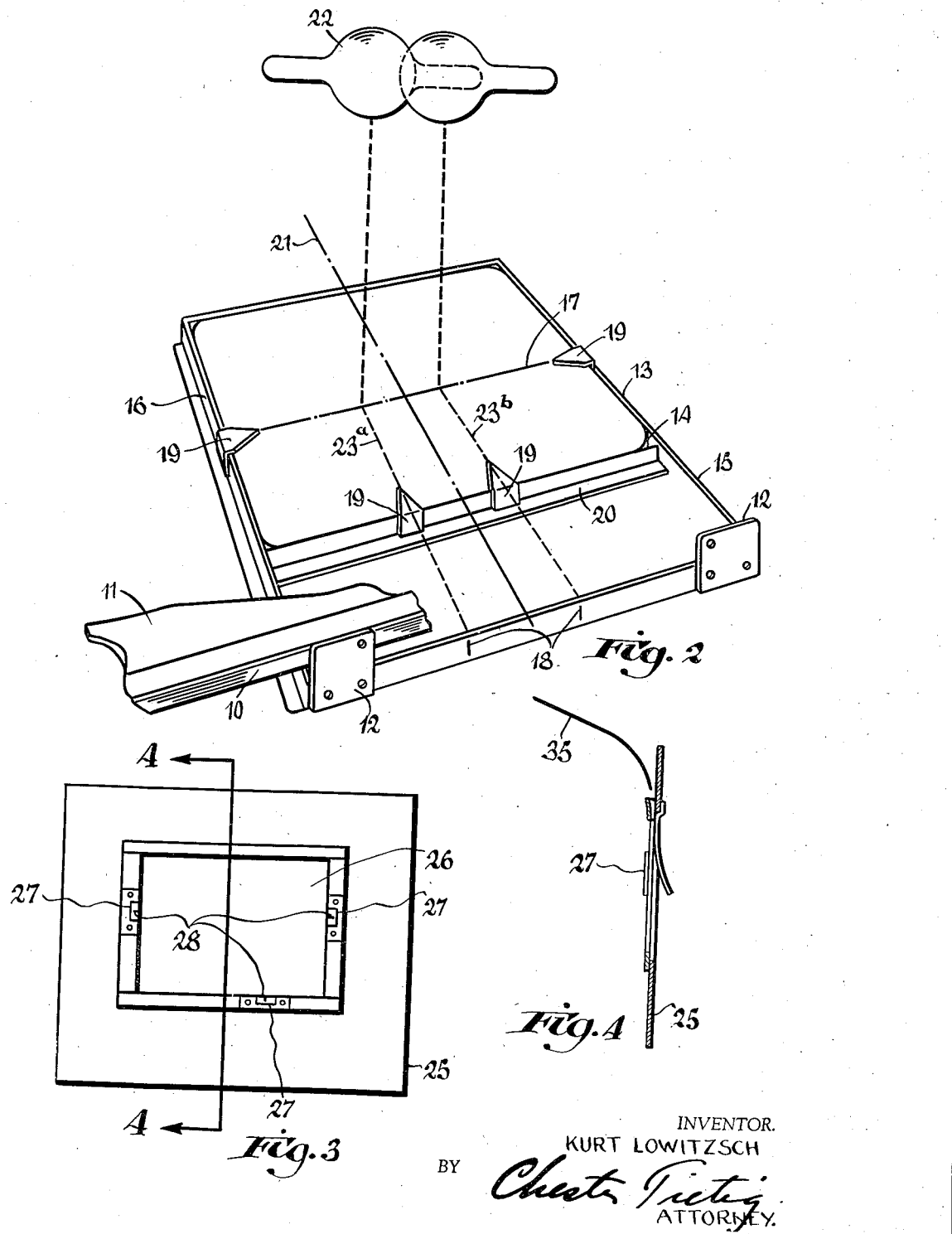
INVENTOR.
KURT LOWITZSCH
BY Chester Pietig
ATTORNEY.

Patented Mar. 10, 1942

2,275,857

UNITED STATES PATENT OFFICE 2,275,857

CASSETTE FRAME FOR X-RAY USE

Kurt Lowitzsch, New York, N. Y., assignor to The Kelley-Koett Manufacturing Co., Inc., Covington, Ky., a corporation of Ohio Original application July 30, 1940, Serial No. 348,403. Divided and this application March 19, 1941, Serial No. 384,136

2 Claims. (Cl. 250—66)

This application is a division of my co-pending application Serial No. 348,403, filed July 30, 1940.

This invention relates to a stereoscopic method and apparatus which has to do with the use of radiographs on film for the purpose of producing a free floating image, usually of the same size of the original bone structure from which the radiographs were taken. Such stereoscopy is extensively employed in female pelvimetry. The apparatus used for such work is known as the "Keleket Moloy-Golden stereoscope." This instrument is manufactured by The Kelley-Koett Manufacturing Company of Covington, Kentucky, and is illustrated and described in an article entitled "The Use of the Roentgen Ray in Obstetrics" by Caldwell, Moloy and Swenson, Radiology, March, April and May, 1939, particularly on page 314 for March.

The present invention relates to a method and apparatus for aligning the radiographs at the time of using them in the stereoscope mentioned, so that a perfect stereoscopic image of the same size will be obtained by reason of the alignment being the same as when the radiographs were made.

Referring now to the drawings, Figure 1 is a diagrammatic plan view of the optical system of the stereoscope above referred to and illustrates the position of the observer's eye during the use of the steps of observation in the method.

Figure 2 is a perspective view of my aligning apparatus, specifically a special cassette frame. Also shown diagrammatically are the positions of the X-ray tube during the operation of making a stereoscopic exposure.

Figure 3 is a front elevation of a film holder and alignment gauge which is to be used over a film view-box for viewing the radiographs in the stereoscope. Two of these film holders are employed.

Figure 4 is a longitudinal section taken along the line 4—4 of Figure 3 and shows the envelope-like construction of the film holder.

Figure 1:
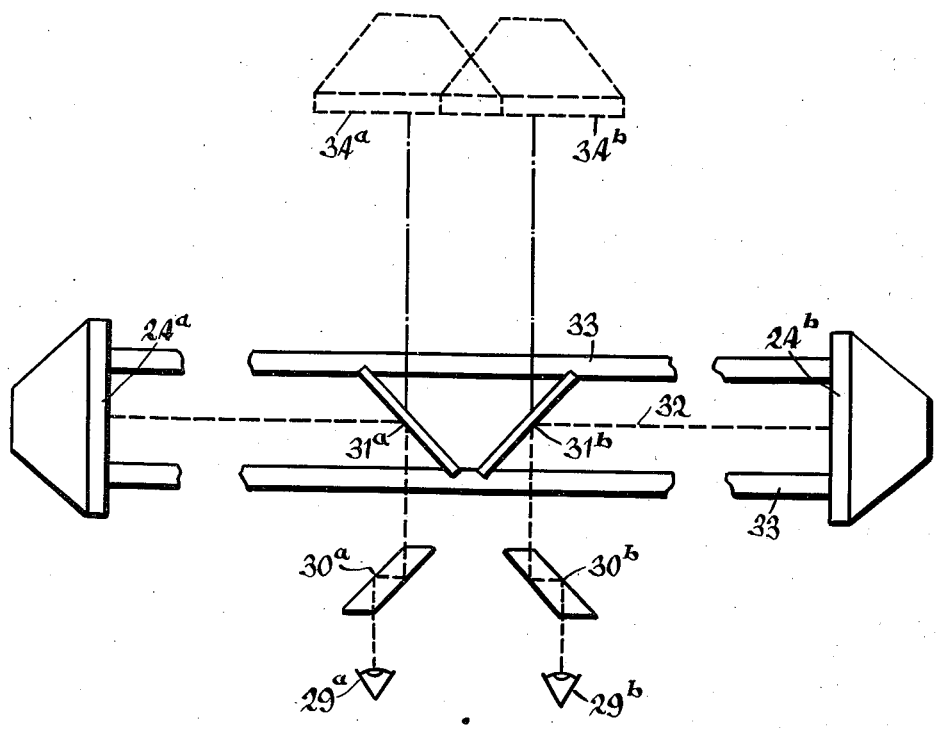

Referring again to Figure 2, 10 is the front rail of the bed 11 of an X-ray table. In contact with rail 10 are a pair of lugs 12, the function of which is to act as alignment stops for a cassette frame 13 which is intended to fit over the ordinary cassette 14 at the time stereoscopic radiographs are being made. The frame comprises an extension portion 15 and a cassette holding portion 16. The reason for the extension portion is to center cassette 14 under the middle line 17 of the table and to provide visible gauge marks 18 for properly centering the X-ray tube above the cassette and for defining a stereoscopic distance through which the tube must be displaced. Around the periphery of the cassette holding portion 16 there is provided a plurality of triangular metal inwardly projecting fins 19, the function of which is to serve as gauges by casting a radiographic shadow on the film in the cassette. One pair of gauges 19 is attached to a cross bar 20 which runs across the frame and defines that edge of the cassette which is nearest the rail 10 and parallel thereto. This pair of gauges is a stereoscopic distance namely two and one-half inches apart and equidistant from the middle dividing line 21 which bisects the cassette crosswise of the table. The intersection of lines 17 and 21 is therefore substantially the center of the cassette and of the film within it. Any variation in the position of the film from exact alignment with the cassette is of no consequence for the reason that after exposure, the film will thenceforth be aligned according to the shadows cast by the gauges 19 and not by the outside dimensions of the film.

Assuming now that the film is ready for exposure inside the cassette, the X-ray tube 22 is aligned over line 17 at the intersection of that line with a line 23a or 23b drawn from the tips of the front pair of gauges 19 parallel to line 21. The exposure is made in the usual way for stereoscopy, namely, that one film is exposed when the tube is over the left-hand gauge line 23a and another film is exposed when the tube is over right-hand gauge line 23b.

The films are developed in the usual way and as before mentioned each now bears radiographic shadows on its edges which are substantially coextensive with the gauges 19. The developed and dried films are now mounted each in a view box 24a or 24b or a Moloy stereoscope (Figure 1). The films are mounted in the same relative positions as they were when they were exposed. In order to mount them, they are slipped into a metal envelope 25 (Figures 3 and 4), said envelope having an opening 26 in the margins of which opening are three rectangular notches 27. These notches are covered with a transparent sheet material which may be "Celluloid" or "Cellophane." Each piece of "Celluloid" bears an inked aligning mark 28 which corresponds in its relation to the opening to the positions occupied by one of three or permissibly four gauges 19 on the cassette frame 13. A retaining means, not shown, is provided to hold the film holder or envelope 25 against the view-boxes 24a and 24b and accurately position the same with respect to the optical system. It is to be understood, of course, that one envelope is used for each view-box and that the notch 27 is in one case on the right hand side of the envelope to be used with the right hand stereoscopic film and that the left-hand envelope is provided with a left hand notch to be used in connection with a left hand stereoscopic film.

The films 35 within the envelopes 25 are placed therein so that the permanent shadow marks cast by the gauges 19 on the films are in alignment with the marks 28 on each envelope 25. Of course, this is possible only with three out of four of the shadows. A different shadow, i. e., left or right is employed in box 24b as contrasted with box 24a. The result is, however, that the alignment of the films in the stereoscopic system shown in Figure 1 coincides exactly with the radiographic system that existed when the films were exposed.

In regard to Figure 1, it may be stated that 29a and 29b are the left and right eyes respectively of the observer. The two prisms 30a and 30b are rhomboids so mounted that the outer end can be adjusted to the actual distance between the right and left eyes of the observer while the inner end maintains a distance apart of two and one-half inches corresponding to the stereoscopic distance used while making the radiograph. 31a and 31b are transparent mirrors disposed at 45° to the axis of vision and located so as to be bisected by a line 32 drawn from the middle of one view-box 24a to the middle of the other 24b. The optical distance from the eye to the observer to the view-box by way of the rhomboid and the mirror is precisely the same as the target-film distance used in the making of the radiograph. A certain latitude in target-film distance is made possible therefore by the fact that view-box 24a and 24b are slidable inwardly and outwardly upon rails 33. It is to be understood that applicant lays no claim to having invented the stereoscope here discussed or the optical system used therein, except as regards the provision of the cassette frame 13 bearing gauge points 19, the use of radiographic shadows cast on the film by said gauge points, the provision and use of the film holder or envelope 25 before the view-boxes, the provision of the marked apertures 27 and 28 therein, the use of radiographically marked film, the gauge points on which are used to correspond to the gauge mark 28 in film holder 25 and the alignment method described.

The resulting stereoscopic images 34a and 34b in Figure 1 when all the prescribed conditions have been attained, blend together and furnish an image which is seen as free floating in space and which is of a size exactly equal to that observed in the original object photographed by means of X-rays upon the film. It is therefore possible for the observer to hold a ruler in his hand behind the mirrors 31a and 31b in such position that it appears when observed through the stereoscope to be in the plane of the parts of the projected image which it is desired to measure. The measurement can then be carried out with the same assurance that the dimensions observed will be relatively the same as if the measurement had been conducted upon the body of the patient who was radiographed.

I claim as my invention:

1. A cassette frame comprising an extension portion and a cassette holding portion, gauge points made of an X-ray opaque substance attached to the inner edge of said cassette holding portion in such a position as to clear the cassette therein and to cast a Roentgen shadow upon the film in said cassette during X-ray exposure, there being gauge points provided for at least three sides of said film, said points being arranged so that two are oppositely disposed on the longitudinal axis of the film and two disposed equidistantly from the vertical axis of the film at the same edge thereof at a stereoscopic distance apart.

2. A cassette frame comprising an extension portion and a cassette-holding portion, gauge points made of an X-ray-opaque substance attached to the inner edge of said cassette-holding portion in such a position as to clear the cassette therein and to cast a Roentgen shadow upon the film in said cassette during X-ray exposure, said shadow being in position to indicate proper alignment of the film in a stereoscope for purposes of stereoscopic projection.

KURT LOWITZSCH.